(12) United States Patent
Hayes et al.

(10) Patent No.: US 10,626,979 B2
(45) Date of Patent: Apr. 21, 2020

(54) AXLE SYSTEM WITH FLUIDLY CONNECTED AXLE ASSEMBLIES

(71) Applicant: ArvinMeritor Technology, LLC, Troy, MI (US)

(72) Inventors: Brian D. Hayes, Newark, OH (US); Dale Eschenburg, Rochester Hills, MI (US); Pedro Garcia, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 316 days.

(21) Appl. No.: 15/798,593

(22) Filed: Oct. 31, 2017

(65) Prior Publication Data

US 2019/0128401 A1 May 2, 2019

(51) Int. Cl.
| | | |
|---|---|---|
| *F16H 57/04* | (2010.01) | |
| *F16N 7/38* | (2006.01) | |
| *F16N 7/26* | (2006.01) | |
| *F16H 48/08* | (2006.01) | |
| *B60K 17/16* | (2006.01) | |
| *B60K 17/36* | (2006.01) | |

(52) U.S. Cl.
CPC ..... *F16H 57/0483* (2013.01); *F16H 57/0436* (2013.01); *F16H 57/0457* (2013.01); *F16N 7/26* (2013.01); *F16N 7/38* (2013.01); *B60K 17/16* (2013.01); *B60K 17/36* (2013.01); *B60Y 2306/03* (2013.01); *F16H 48/08* (2013.01)

(58) Field of Classification Search
CPC ........ B60K 17/16; B60K 17/36; B60K 17/08; B60K 17/346; B60K 17/348
USPC ......................................................... 184/6.12
See application file for complete search history.

(56) References Cited

U.S. PATENT DOCUMENTS

| | | | | |
|---|---|---|---|---|
| 4,754,847 | A * | 7/1988 | Glaze ..................... | B60K 17/36 184/6.12 |
| 5,316,106 | A * | 5/1994 | Baedke .................. | B60K 17/16 184/104.3 |
| 9,457,654 | B2 * | 10/2016 | Anderson ............. | B60K 17/16 |
| 2014/0129100 | A1 * | 5/2014 | Nellums ............... | B60W 10/04 701/58 |
| 2019/0337384 | A1 * | 11/2019 | Matsushita ............ | B60K 17/08 |

OTHER PUBLICATIONS

United States Patent and Trademark Office, U.S. Appl. No. 15/347,426, filed Nov. 9, 2016.

* cited by examiner

*Primary Examiner* — Henry Y Liu

(74) *Attorney, Agent, or Firm* — Brooks Kushman PC

(57) ABSTRACT

An axle system having a first axle assembly, a second axle assembly, and a conduit. The conduit may fluidly connect the first axle assembly to the second axle assembly such that lubricant may flow between a first housing assembly of the first axle assembly and a second housing assembly of the second axle assembly.

20 Claims, 10 Drawing Sheets

US 10,626,979 B2

AXLE SYSTEM WITH FLUIDLY CONNECTED AXLE ASSEMBLIES

TECHNICAL FIELD

This disclosure relates to an axle system having fluidly-connected axle assemblies.

BACKGROUND

A drive axle system is disclosed in U.S. Pat. No. 9,457,654.

SUMMARY

In at least one embodiment, an axle system is provided. The axle system may include a first axle assembly, a second axle assembly, and a conduit. The first axle assembly may have a first housing assembly that may receive a first differential. The second axle assembly may have a second housing assembly that may receive a second differential. The conduit may fluidly connect the first axle assembly to the second axle assembly such that lubricant may flow between the first housing assembly and the second housing assembly.

In at least one embodiment, an axle system is provided. The axle system may include a first axle assembly, a second axle assembly, a first conduit, and a second conduit. The first axle assembly may have a first housing assembly that may receive a first differential. The second axle assembly may have a second housing assembly that may receive a second differential. The first conduit may transport lubricant from the first housing assembly to the second housing assembly. The second conduit may transmit lubricant from the second housing assembly to the first housing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
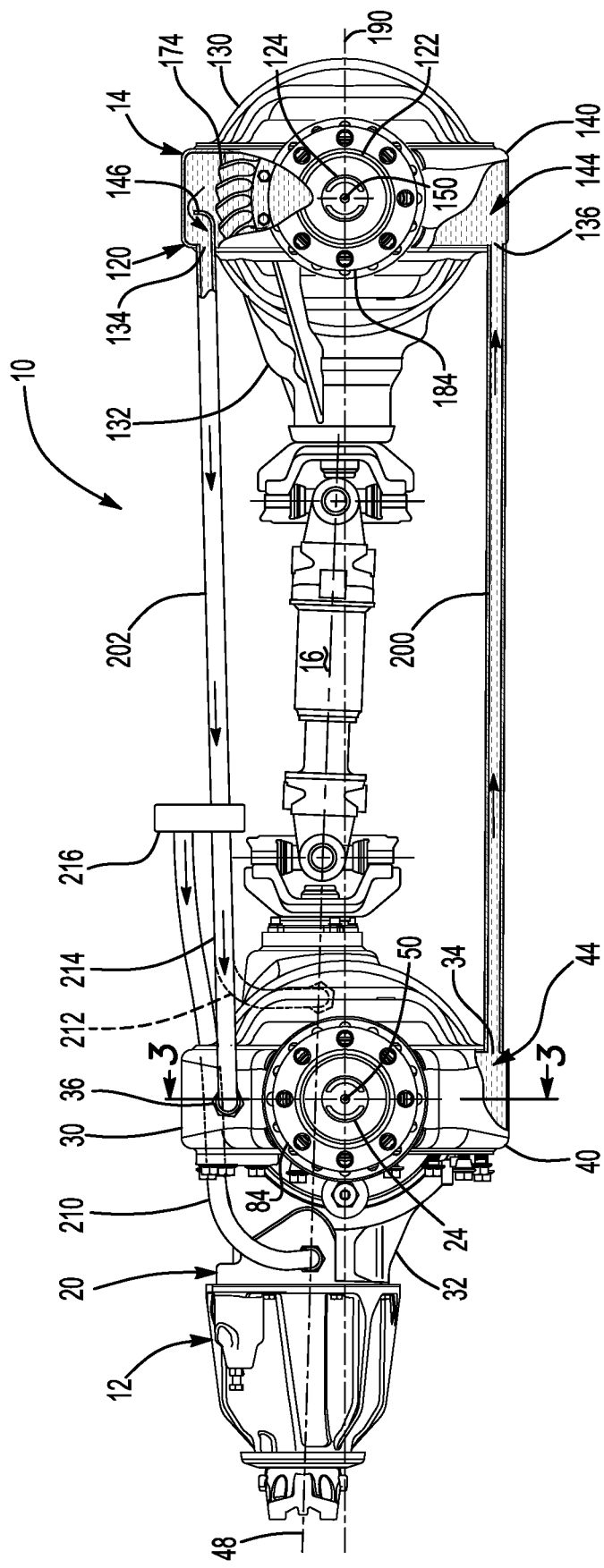
FIG. 1 is a side view of an example of an axle system.

Referring to FIG. 1, an example of an axle system 10 is shown. The axle system 10 may be provided with a vehicle, such as a motor vehicle like a truck, farm equipment, military transport or weaponry vehicle, or cargo loading equipment for land, air, or marine vessels. The vehicle may include a trailer for transporting cargo in one or more embodiments.

The axle system 10 may include a plurality of axle assemblies, such as a front axle assembly 12 and a rear axle assembly 14. The front axle assembly 12 and the rear axle assembly 14 may be drive axle assemblies. A drive axle assembly may be part of a vehicle drivetrain and may receive torque from a torque source, such as an engine or electric motor. The drive axle assembly may provide torque to one or more wheel assemblies that may be rotatably supported on the drive axle assembly.

In FIG. 1, two axle assemblies are shown in a tandem axle configuration, although it is contemplated that a greater number of axle assemblies may be provided. In a tandem configuration, the front axle assembly 12, which may also be referred to as a forward-rear drive axle assembly, may be connected in series with the rear axle assembly 14, which may also be referred to as a rear-rear drive axle assembly. The front axle assembly 12 may be spaced apart from the rear axle assembly 14. An output of the front axle assembly 12 may be coupled to an input of the rear axle assembly 14 via a prop shaft 16. The prop shaft 16 may be coupled to the output of the front axle assembly 12 and the input of the rear axle assembly 14 at opposing ends via couplings, such as universal joints, that may allow the front axle assembly 12 and the rear axle assembly 14 to move with respect to each other while allowing the prop shaft 16 to rotate about a prop shaft axis.

Figure 2:
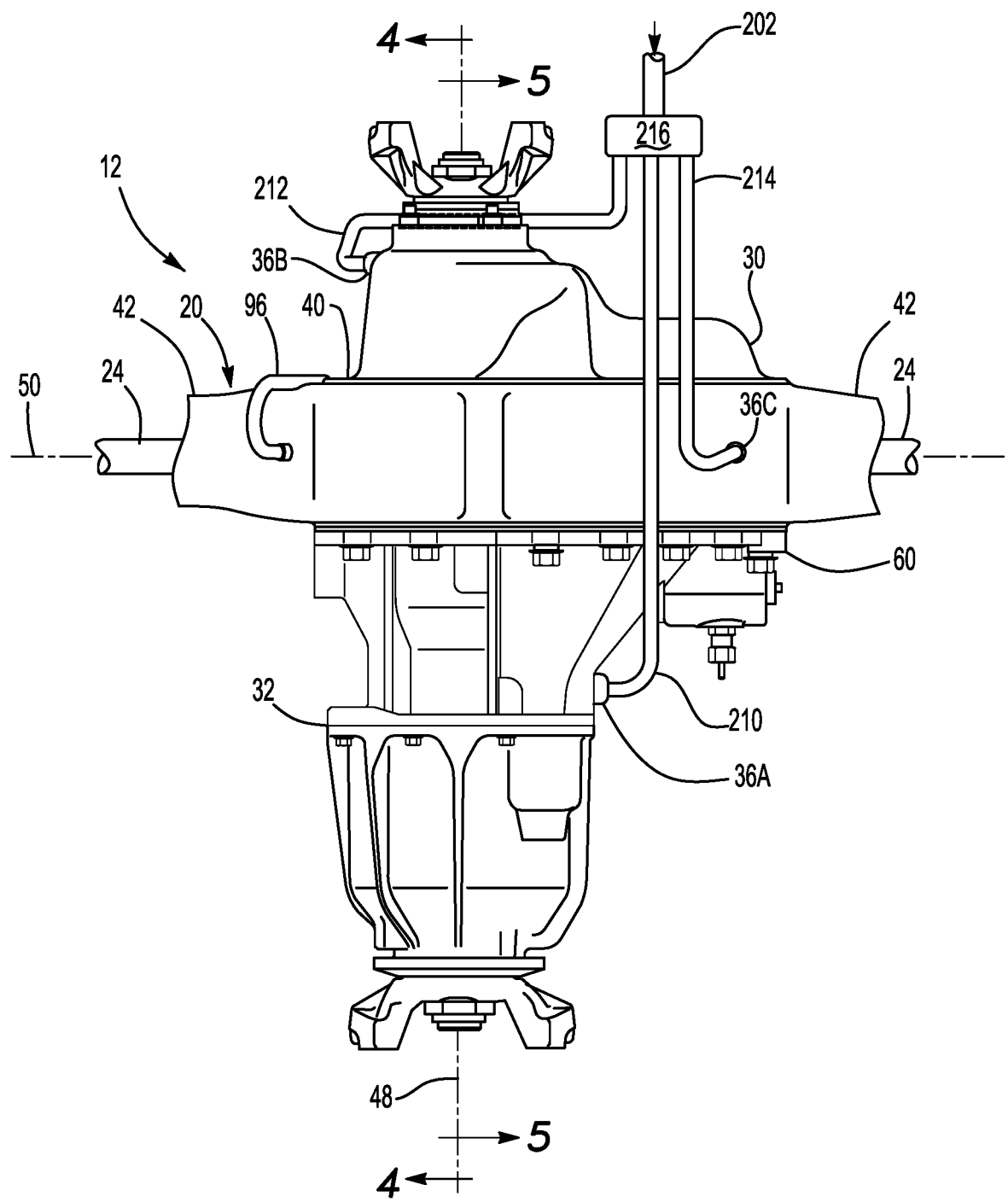
FIG. 2 is a top view of a portion of the axle system.
Figure 3:
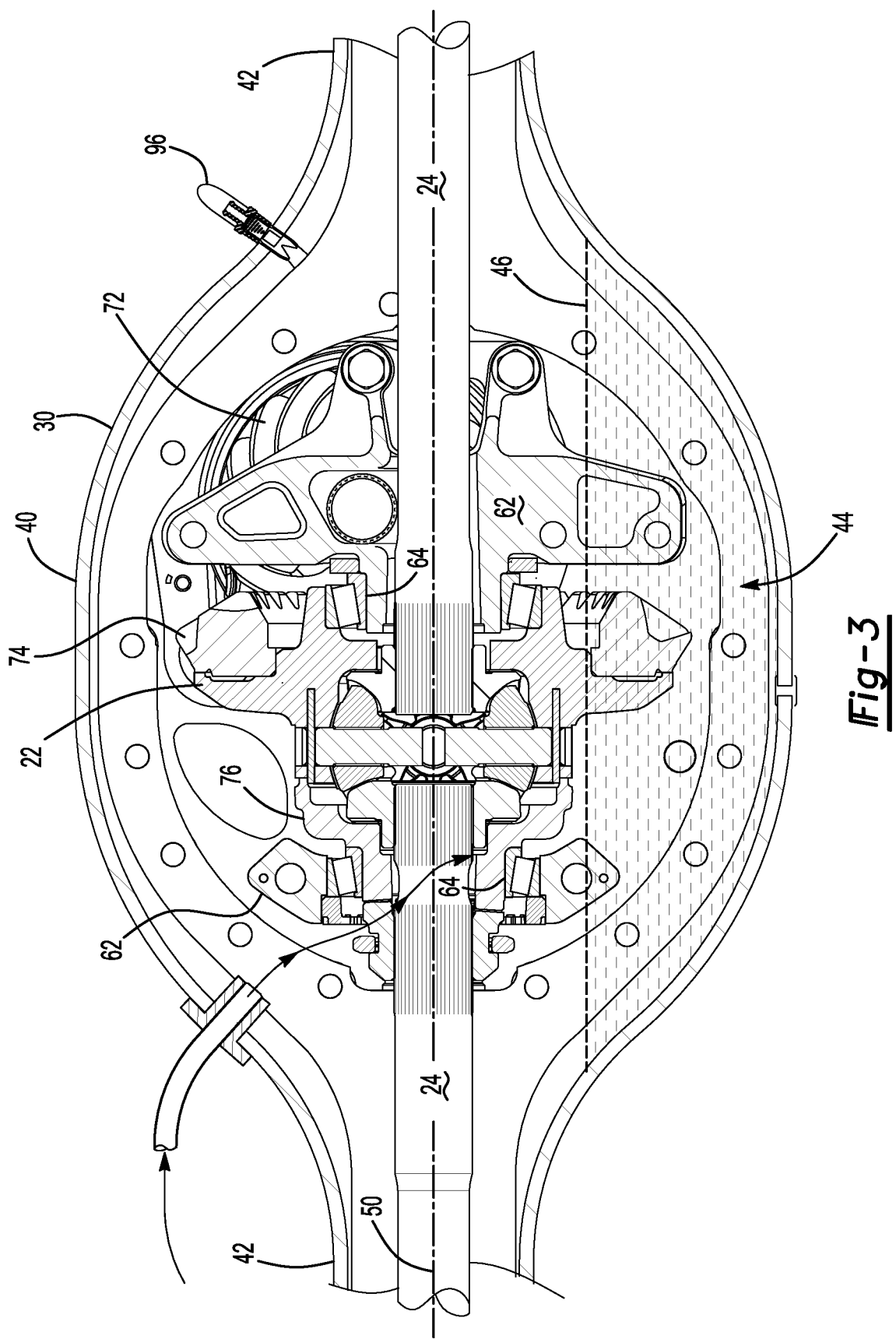
FIG. 3 is a section view along section line 3-3.

Referring to FIGS. 1-3, the front axle assembly 12 may include a housing assembly 20, a differential 22, and at least one axle shaft 24.

The housing assembly 20 may receive various components of the front axle assembly 12. In addition, the housing assembly 20 may facilitate mounting of the front axle assembly 12 to the vehicle. In at least one configuration, the housing assembly 20 may include an axle housing 30, a differential carrier 32, at least one outlet port 34, and one or more inlet ports 36A-36C.

The axle housing 30 may receive and support the axle shafts 24. In at least one configuration, the axle housing 30 may include a center portion 40 and at least one arm portion 42.

The center portion 40 may be disposed proximate the center of the axle housing 30. As is best shown in FIG. 3, the center portion 40 may define a cavity that may receive the differential 22. As is best shown in FIGS. 1 and 3, a lower region of the center portion 40 may at least partially define a sump portion 44 that may contain lubricant 46, such as oil. Splashed lubricant may flow down the sides of the center portion 40 and may flow over internal components of the front axle assembly 12 and gather in the sump portion 44.

The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

Referring to FIG. 1, at least one outlet port 34 may be provided to allow lubricant 46 to exit the front axle assembly 12 and be routed to the rear axle assembly 14. An outlet port 34 may be a through hole that may extend through a portion the housing assembly 20, such as the axle housing 30. In the configuration shown in FIG. 1, one outlet port 34 is provided that is disposed near the bottom of the center portion 40 and adjacent to the sump portion 44. As such, the outlet port 34 may be disposed below the differential 22.

Referring to FIGS. 1 and 2, one or more inlet ports may be provided to allow lubricant 46 from the rear axle assembly 14 to enter the front axle assembly 12. An inlet port may be a through hole that may extend through a portion of the housing assembly 20, such as the axle housing 30, differential carrier 32, or combinations thereof. In the configuration shown in FIGS. 1-5, three inlet ports are provided; however, it is contemplated that a greater or lesser number of inlet ports may be provided. As is best shown with reference to FIGS. 2, 4 and 5, a first inlet port 36A may be provided with the differential carrier 32, a second inlet port 36B may be provided in the axle housing 30 on an opposite side of the housing assembly 20 from the first inlet port 36A, and a third inlet port 36C may be provided with the center portion 40 of the axle housing 30. The inlet ports 36A, 36B, 36C may be disposed above the sump portion 44 and above an input axis 48 and a first axis 50 of the front axle assembly 12. It is also contemplated that one or more inlet ports 36A, 36B, 36C may be provided in different locations.

Referring to FIGS. 2 and 3 one or more arm portions 42 may extend from the center portion 40. For example, two arm portions 42 may extend in opposite directions from the center portion 40 and away from the differential 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24.

Referring to FIGS. 1 and 2, the differential carrier 32, which may also be called a carrier housing, may be mounted to the center portion 40 of the axle housing 30. The differential carrier 32 may rotatably support the differential 22. The differential carrier 32 may be configured as a single component or as multiple components that are assembled to each other. As is best shown with reference to FIGS. 2 and 3, the differential carrier 32 may have a flange portion 60 and one or more bearing supports 62.

Referring to FIGS. 1 and 2, the flange portion 60 may facilitate mounting of the differential carrier 32 to the axle housing 30. For example, the flange portion 60 may be disposed on the carrier mounting surface of the axle housing 30 and may have a set of holes that may receive fasteners as previously discussed.

Referring to FIG. 3, a bearing support 62 may receive a roller bearing 64 that may rotatably support the differential 22. For example, two bearing supports 62 may be received in the center portion 40 and may be located near or at opposite sides of the differential 22. The bearing support 62 may be provided in various configurations. For example, a bearing support 62 may include a pair of legs that extend from the differential carrier 32 and a bearing cap. The bearing cap may be mounted to the legs and may arch over a roller bearing 64. In such a configuration, the bearing support 62 and bearing cap may cooperate to extend around, receive, and secure the roller bearing 64. As another example, the bearing support 62 may be received inside a roller bearing 64 which in turn may support the differential 22.

Figure 4:
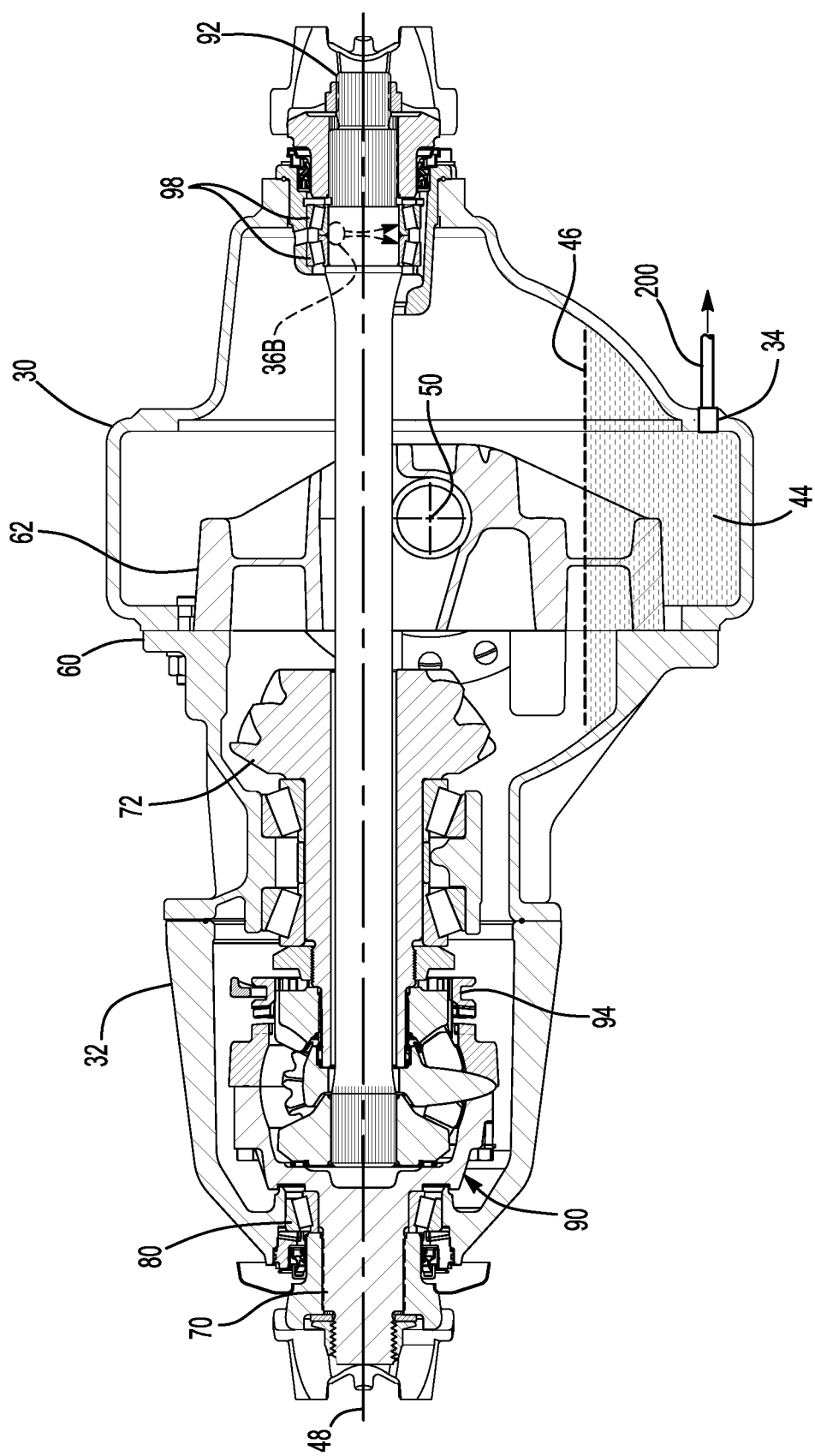
FIG. 4 is a section view along section line 4-4.
Figure 5:
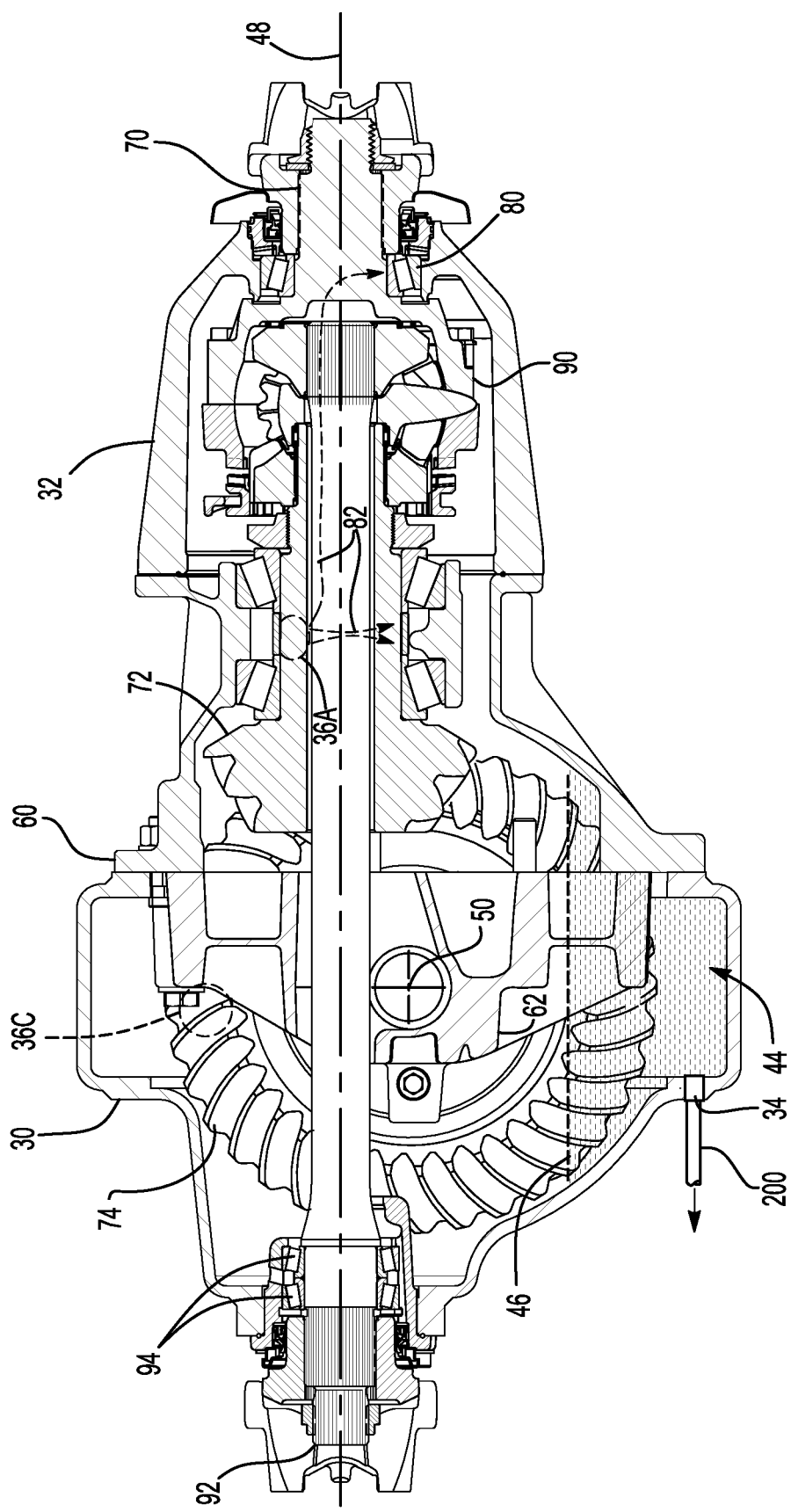
FIG. 5 is a section view along section line 5-5.

Referring to FIGS. 3 and 5, the differential 22 may be disposed in the center portion 40 of the housing assembly 20. The differential 22 may transmit torque to the vehicle traction wheel assemblies of the front axle assembly 12 and may permit the traction wheel assemblies to rotate at different velocities. Referring to FIGS. 3-5, an input shaft 70, a drive pinion 72, a ring gear 74, and a differential unit 76 are shown to facilitate an abbreviated discussion of the operation of the front axle assembly 12 and the differential 22.

Referring to FIGS. 4 and 5, the input shaft 70 may receive torque from a vehicle power source, such as an engine or electric motor. The input shaft 70 may be rotatable about an input axis 48 may be rotatably supported by one or more roller bearings 80 that may be disposed on the differential carrier 32. The input shaft 70 may be operatively connected to the drive pinion 72 or integrally formed with the drive pinion 72 in various configurations.

Referring to FIGS. 3 and 5, the drive pinion 72 may provide torque to the ring gear 74. For example, the drive pinion 72 may have teeth that may mesh with teeth on the ring gear 74. A clutch collar 82 may be movable between a first position in which the interaxle differential unit 90 is locked and a second position in which interaxle differentia unit is unlocked such that the input shaft 70 and output shaft 92 may rotate with respect to each other.

The ring gear 74 may transmit torque the differential unit 76. For instance, the ring gear 74 may be fixedly mounted to a case of the differential unit 76. The case may receive gears that may be operatively connected to the axle shafts 24. The ring gear 74 may be rotatable about a first axis 50 and may splash lubricant 46 that has accumulated in the sump portion 44 as it rotates.

The differential unit 76 may be generally disposed in the center portion 40 of the axle housing 30 and may be configured to permit the axle shafts 24 to rotate at different speeds. As is best shown in FIG. 3, the differential unit 76 may be rotatably supported by the roller bearings 64 and may be operatively connected to the axle shafts 24. As such, the differential unit 76 may receive torque from the ring gear 74 and provide torque to the axle shafts 24.

The axle shafts 24 may transmit torque from the differential 22 to corresponding traction wheel assemblies of the front axle assembly 12. The axle shafts 24 may be rotated about the first axis 50 by the differential 22. One end of the axle shaft 24 may be operatively connected to the differential 22. Another end of the axle shaft 24 may be operatively connected to a wheel end assembly that may have a wheel hub that may support a wheel. As shown in FIG. 1, an axle flange 84 may be disposed proximate the second end of the axle shaft 24 and may facilitate coupling of the axle shaft 24 to the wheel hub.

Referring to FIGS. 4 and 5, the axle system 10 may also include an interaxle differential unit 90, an output shaft 92, a clutch collar 94, and a breather tube 96.

The interaxle differential unit 90 may compensate for speed differences between different drive axle assemblies, such as speed differences between the front axle assembly 12 and the rear axle assembly 14. In the configuration shown, the interaxle differential unit 90 is provided with the front axle assembly 12; however, it is contemplated that the interaxle differential unit 90 may be provided with the rear axle assembly 14. In at least one configuration, the interaxle differential unit 90 may operatively connect the input shaft 70 to the drive pinion 72 and/or the output shaft 92.

The output shaft 92 may extend along and may be configured to rotate about the input axis 48. For instance, the output shaft 92 may be supported by one or more roller bearings 98 that may be disposed on the housing assembly 20. In at least one configuration, the output shaft 92 may be coupled to the interaxle differential unit 90 at a first end and may be fixedly coupled to an output yoke at a second end. The output shaft 92 may or may not extend through the drive pinion 72 in one or more configurations.

The clutch collar 94 may be provided to lock and unlock the interaxle differential unit 90. The clutch collar 94 may be movable between a first position in which the interaxle differential unit 90 is locked and the input shaft 70 and output shaft 92 may not rotate with respect to each other and a second position in which interaxle differential unit 90 is unlocked and the input shaft 70 and output shaft 92 may rotate with respect to each other.

A breather tube 96 may be provided with the axle housing 30. The breather tube 96 may allow air to enter or exit the housing assembly 20.

Referring to FIG. 1, the rear axle assembly 14 may have a similar configuration or the same configuration as the front axle assembly 12. For instance, the rear axle assembly 14 may have the same configuration as the front axle assembly 12 when the rear axle assembly 14 provides torque to another axle assembly that may be connected in series with the rear axle assembly 14. Components such as an interaxle differential unit and/or an output shaft may be omitted when the rear axle assembly 14 does not provide torque to another axle assembly or the interaxle differential unit may be provided with the rear axle assembly 14 rather than the front axle assembly 12. Reference numbers associated with the rear axle assembly 14 are increased by one hundred for features that are similar to or that correspond with features of the front axle assembly 12. For example, the rear axle assembly 14 may include a housing assembly 120, a differential 122, and at least one axle shaft 124.

The housing assembly 120 may receive various components of the rear axle assembly 14. In addition, the housing assembly 120 may facilitate mounting of the rear axle assembly 14 to the vehicle. The housing assembly 120 may include an axle housing 130 a differential carrier 132, an outlet port 134, and an inlet port 136.

The axle housing 130 may receive and support the axle shafts 24. In at least one configuration, the axle housing 130 may include a center portion 140 and arm portions as previously described.

The center portion 140 may be disposed proximate the center of the axle housing 130. The center portion 140 may define a cavity that may receive the differential 122. As is best shown with reference to FIG. 1, a lower region of the center portion 140 may at least partially define a sump portion 144 that may contain lubricant 46, such as oil. Splashed lubricant may flow down the sides of the center portion 140 and may flow over internal components of the rear axle assembly 14 and gather in the sump portion 144. The center portion 140 may also include a lubricant collection trough 146. The lubricant collection trough 146 may be disposed above the differential 122 and may receive lubricant that is splashed by rotating components of the rear axle assembly 14, such as a ring gear that may be provided with the differential 122. The lubricant collection trough 146 may route lubricant 46 to the outlet port 134.

The outlet port 134 may be provided to allow lubricant 46 to exit the rear axle assembly 14 and be routed to the front axle assembly 12. An outlet port 134 may be a through hole that may extend through a portion the housing assembly 20, such as the axle housing 130 or the differential carrier 132. In the configuration shown in FIG. 1, one outlet port 134 is provided that is disposed near the top of the center portion 140 adjacent to the lubricant collection trough 146.

The inlet port 136 may be provided to allow lubricant 46 from the front axle assembly 12 to enter the rear axle assembly 14. The inlet port 136 may be a through hole that may extend through a portion of the housing assembly 20, such as the axle housing 30. In the configuration shown in FIG. 1, the inlet port 136 is provided that is disposed near the bottom of the center portion 140 and adjacent to the sump portion 144. As such, the inlet port 136 may be disposed below the differential 122.

The differential carrier 132 may be mounted to the center portion 140 of the axle housing 130 and may rotatably support the differential 122. For example, the differential carrier 132 may include bearing supports and roller bearing assemblies as previously described.

The differential 122 may be disposed in the center portion 140 of the housing assembly 120 and may be substantially similar or identical to the differential 22 as previously described. As such, the differential 122 may transmit torque to the axle shafts 124 and traction wheel assemblies of the rear axle assembly 14 and may permit the traction wheel assemblies of the rear axle assembly 14 to rotate at different velocities. For example, the differential 122 may have a ring gear 174 that may receive torque from a drive pinion of the rear axle assembly 14 that may be operatively connected to the prop shaft 16. In at least one configuration, the rear axle assembly 14 may be selectively disconnected from the front axle assembly 12 or the prop shaft 16 so that torque is not provided to the differential 122. The front axle assembly 12 and rear axle assembly 14 may be selectively connected and disconnected in any suitable manner, such as with a clutch collar, disc clutch, or the like that may be disposed along the torque transmission path between the axle assemblies. The ring gear 174 may be rotatable about a second axis 150 and may splash lubricant 46 that has accumulated in the sump portion 144 as it rotates. The ring gear 174 may be mounted on a case of a differential unit of the differential 122.

The axle shafts 124 may transmit torque from the differential 122 to corresponding traction wheel assemblies of the rear axle assembly 14. The axle shafts 124 may be rotated about the second axis 150 by the differential 122. One end of the axle shaft 124 may be operatively connected to the differential 122 while another end of the axle shaft 124 may be operatively connected to a wheel end assembly that may have a wheel hub that may support a wheel. It is also contemplated that the axle shafts 124 may be disconnectable from the differential 122. As shown in FIG. 1, an axle flange 184 may be disposed proximate the second end of the axle shaft 124 and may facilitate coupling of the axle shaft 124 to the wheel hub.

The first axis 50 and the second axis 150 may be disposed in a substantially horizontal plane 190 when the front axle assembly 12 and the rear axle assembly 14 are in nominal design positions, such as when the first axis 50 and second axis 150 are disposed substantially equal distances from a vehicle chassis.

The axle system 10 may include one or more conduits. A conduit may fluidly connect the front axle assembly 12 to the rear axle assembly 14 such that lubricant 46 flows between the housing assembly 20 of the front axle assembly 12 and the housing assembly 120 of the rear axle assembly 14. A conduit may have any suitable configuration. For example, the conduit may include a flexible hose or flexible tubing to accommodate movement the front axle assembly 12 and the rear axle assembly 14, such as generally vertical movement and/or torsional movement that may be permitted by a suspension system that may independently mount the front axle assembly 12 and the rear axle assembly 14 to a vehicle chassis. A portion of the conduit may include rigid tubing or a rigid pipe in one or more configurations.

In the configuration shown in FIG. 1, two conduits are provided. For convenience in reference, these conduits may be referred to as a first conduit 200 and a second conduit 202.

The first conduit 200 may provide or transport lubricant 46 between the axle assemblies. For instance, the first conduit 200 may provide or transport lubricant 46 from the front axle assembly 12 to the rear axle assembly 14. In at least one configuration, the first conduit 200 may be completely disposed outside of the housing assembly 20 of the front axle assembly 12, the housing assembly 120 of the rear axle assembly 14, or both. The first conduit 200 may be fluidly connected to the outlet port 34 of the front axle assembly 12 at a first end and may be fluidly connected to the inlet port 136 of the rear axle assembly 14 at a second end. Moreover, the first conduit 200 may extend from the sump portion 44 of the front axle assembly 12 to the sump portion 144 of the rear axle assembly 14. As such, the first conduit 200 may be disposed below the first axis 50 and the second axis 150. In addition, the first conduit 200 may be completely disposed below the second conduit 202.

The second conduit 202 may also provide or transport lubricant 46 between the axle assemblies. For example, the second conduit 202 may provide or transport lubricant 46 from the rear axle assembly 14 to the front axle assembly 12. In at least one configuration, the second conduit 202 may be completely disposed outside of the housing assembly 20 of the front axle assembly 12, the housing assembly 120 of the rear axle assembly 14, or both.

The second conduit 202 may be fluidly connected to the outlet port 134 of the rear axle assembly 14 at a first end and may be fluidly connected to at least one inlet port 36A, 36B, 36C of the front axle assembly 12 at a second end. For example, the first end of the second conduit 202 may be coupled to the housing assembly 20 above the first axis 50 while the second end of the second conduit 202 may be coupled to the housing assembly 120 above the second axis 150. As such, the second conduit 202 may be completely disposed above the first axis 50 and the second axis 150 and the second conduit 202 may not be directly connected to the sump portion 44 of the front axle assembly 12 or the sump portion 144 of the rear axle assembly 14. The second conduit 202 may be coupled to the housing assembly 120 of the rear axle assembly 14 at a location located above where the second conduit 202 is coupled to the housing assembly 20 of the front axle assembly 12. As such, the second conduit 202 may slope downward from the rear axle assembly 14 to the front axle assembly 12 to allow gravity to assist in the flow of lubricant 46 from the rear axle assembly 14 to the front axle assembly 12. In a configuration where the rear axle assembly 14 can be disconnected from a torque source rather than the front axle assembly 12, the second conduit 202 may slope downward from the front axle assembly 12 to the rear axle assembly 14.

Referring to FIGS. 1 and 2, the second conduit 202 may have one or more branches. In the configuration shown, the second conduit 202 is depicted with three branches; however, it is contemplated that a greater or lesser number of branches may be provided. For convenience in reference, the branches may be designated as a first branch 210, a second branch 212, and a third branch 214. The branches may extend from at least one fitting or manifold 216. The manifold 216 may be located between opposite ends of the second conduit 202. Each branch may provide lubricant 46 to a different inlet port of the housing assembly 20.

The first branch 210 may extend from the manifold 216 to the first inlet port 36A. As such, the first branch 210 may provide lubricant 46 to components that may be disposed in the differential carrier 32, such as one or more roller bearings 80 that may rotatably support the input shaft 70, the interaxle differential unit 90, or both.

The second branch 212 may extend from the manifold 216 to the second inlet port 36B. As such, the second branch 212 may provide lubricant 46 to one or more roller bearings 98 that may rotatably support the output shaft 92.

The third branch 214 may extend from the manifold 216 to the third inlet port 36C. As such, the third branch 214 may provide lubricant 46 to components such as the differential 22, one or more roller bearings 64 that may rotatably support the differential 22, or both.

Figure 6:
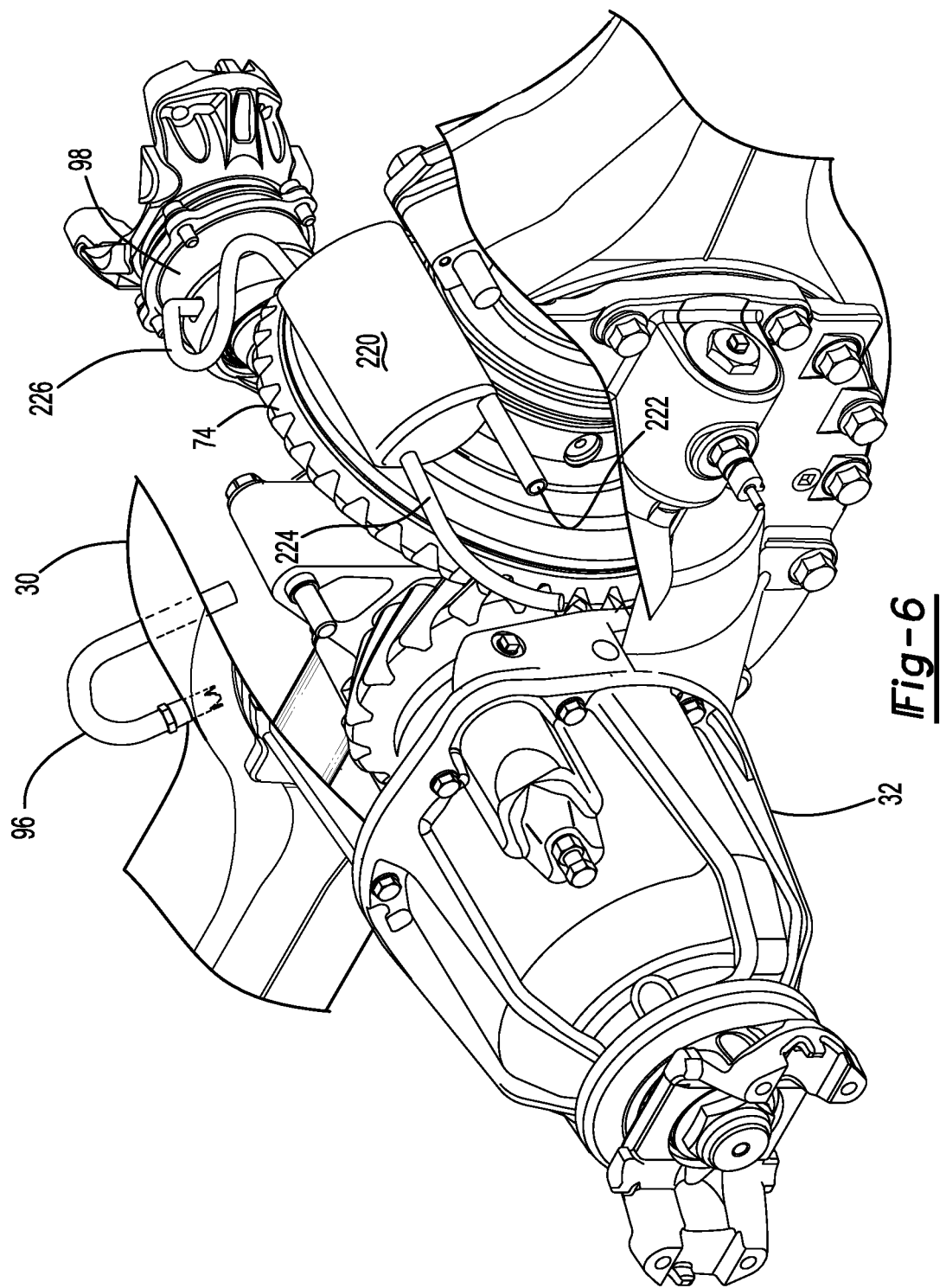
FIG. 6 is a fragmentary view of an axle assembly that may be provided with the axle system that has an internal lubricant reservoir.

Referring to FIG. 6, another configuration of an axle system is shown. In this configuration, the rear axle assembly 14 and the first conduit 200 may be the same as previously discussed. The front axle assembly 12 is depicted as having a single inlet port 36 in the housing assembly 20. The second conduit 202 may provide lubricant 46 to the inlet port 36 and may be provided without a manifold and multiple branches. In addition, the front axle assembly 12 may have one or more lubricant tanks or lubricant reservoirs 220. The lubricant reservoir 220 may be disposed inside the housing assembly 20 and may be located above the differential 22 and the first axis 50. The lubricant reservoir 220 may have an inlet 222 that may receive lubricant 46 from the second conduit 202. In addition, the lubricant reservoir 220 may include a plurality of outlet tubes. In FIG. 6, two outlet tubes are shown; however, it is contemplated that a different number of the tubes may be provided. The outlet tubes may be disposed below the inlet 222 of the lubricant reservoir 220 and may provide lubricant 46 to different locations in the front axle assembly 12. For instance, a first outlet tube 224 may provide lubricant 46 to one or more components that may be disposed in the differential carrier 32, such as one or more roller bearings 80 that may rotatably support the input shaft 70, the interaxle differential unit 90, or both. A second outlet tube 226 may provide lubricant 46 to one or more roller bearings 98 that may rotatably support the output shaft 92. Optionally, one or more valves, such as check valves may be associated with the lubricant reservoir 220 to control the flow of lubricant and help provide or maintain different lubricant levels in each axle assembly. Such a configuration may be employed as an alternative to providing a second conduit that has a plurality of branches that are disposed outside of an axle assembly. Moreover, such a configuration may be employed with the axle system configurations shown in FIGS. 7-9. It is also contemplated that the configuration described above may be provided with the rear axle assembly 14 rather than the front axle assembly 12 when the rear axle assembly 14 is disconnectable from a torque source.

As previously mentioned, the front axle assembly 12 or the rear axle assembly 14 may be selectively disconnectable such that torque may be provided to the differential of one axle assembly but not the other axle assembly. For example, torque may not be provided to the differential 22 of the front axle assembly 12 by disconnecting the drive pinion 72 from the input shaft 70. However, torque may still be provided to the rear axle assembly 14 via the interaxle differential unit 90, the output shaft 92, and the prop shaft 16. As another example, the rear axle assembly 14 may be selectively disconnectable instead of the front axle assembly 12. The transmission of torque to a differential may be terminated in any suitable manner, such as by actuating a clutch collar to disconnect the drive pinion of an axle assembly from a torque source.

Selectively disconnecting an axle assembly may have multiple effects. For instance, if torque is not provided to a differential, then the ring gear associated with the differential may not rotate. As a result, churning losses or frictional drag that may be exerted by the lubricant 46 upon the ring gear and the differential may be reduced, which may improve operating efficiency of the axle system and vehicle fuel economy. In addition, the ring gear may not splash lubricant that is located inside its associated housing assembly. If the differential is not disconnected from the wheels of its axle assembly, then an axle shaft may backdrive or rotate the gears inside the case of the differential, which in turn may result in the loss of lubricant from inside the differential due to centrifugal forces. This lost lubricant may not be replenished by lubricant that would otherwise be splashed or sprayed by the ring gear. Likewise, other components, such as roller bearings, the interaxle differential unit, or combinations thereof may also be deprived of lubricant 46, which may result in increased wear, increased temperatures, and reduce component life.

The axle assembly that continues to receive torque may benefit from reducing the volume of lubricant in its housing assembly, which may reduce churning losses or frictional drag that may be exerted by the lubricant 46 upon its ring gear, which may improve operating efficiency of the axle system and vehicle fuel economy.

Accordingly, it may be desirable to share lubricant between the axle assemblies to provide improved lubricant distribution and/or to intelligently control the level of lubricant in the axle assemblies of the axle system to improve operating efficiency.

In the configurations shown in FIGS. 1-6, lubricant distribution is improved by providing lubricant from one axle assembly to another at locations that may be disposed near rotating components to replace the lubricant that would otherwise be sprayed by the ring gear 74 if it was rotating. Moreover, in this configuration circulating lubricant between the front axle assembly 12 and the rear axle assembly 14 may maintain the level of lubricant in the sump portions 44, 144 at approximately the same height.

Figure 7:
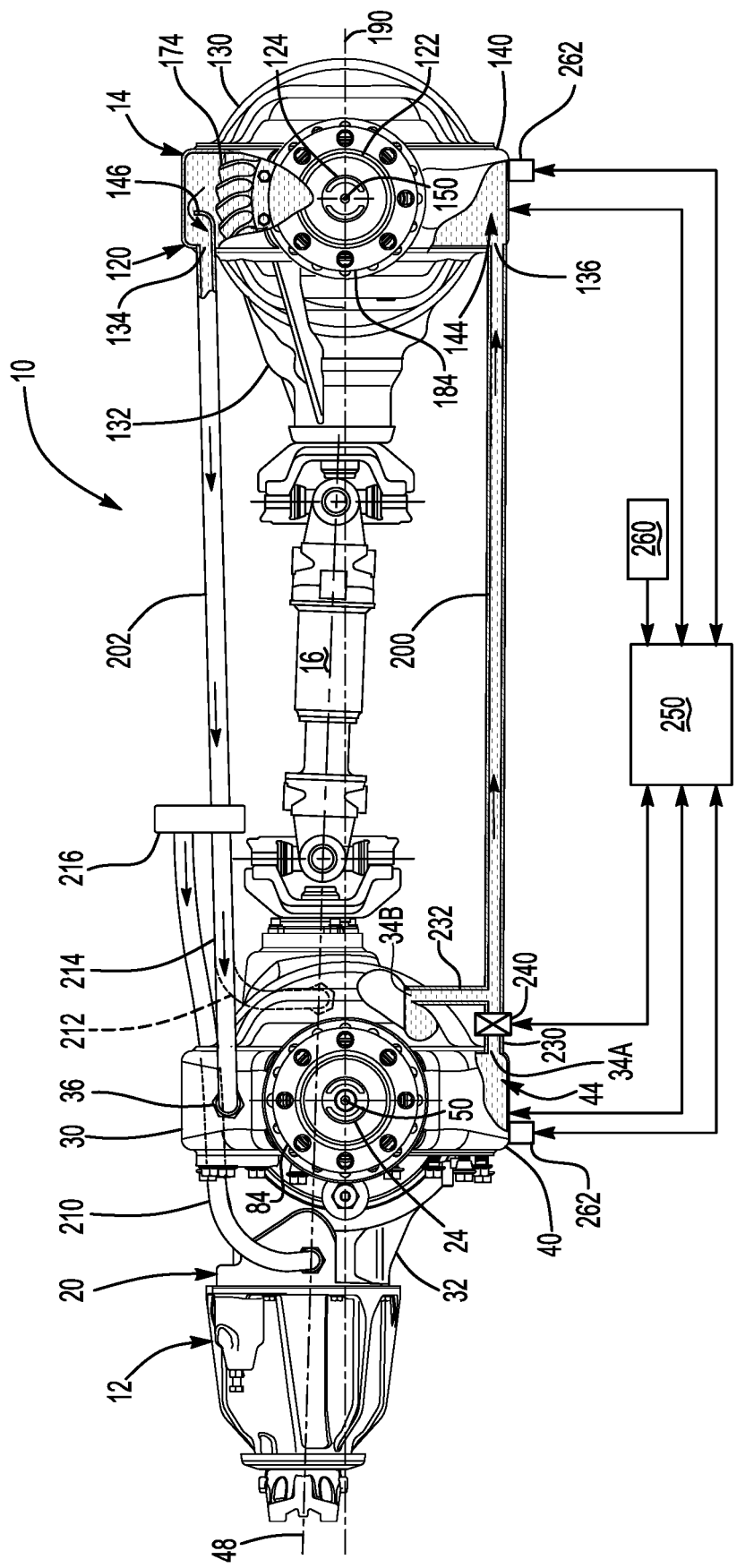
FIG. 7 is a side view of a second configuration of an axle system.
Figure 8:
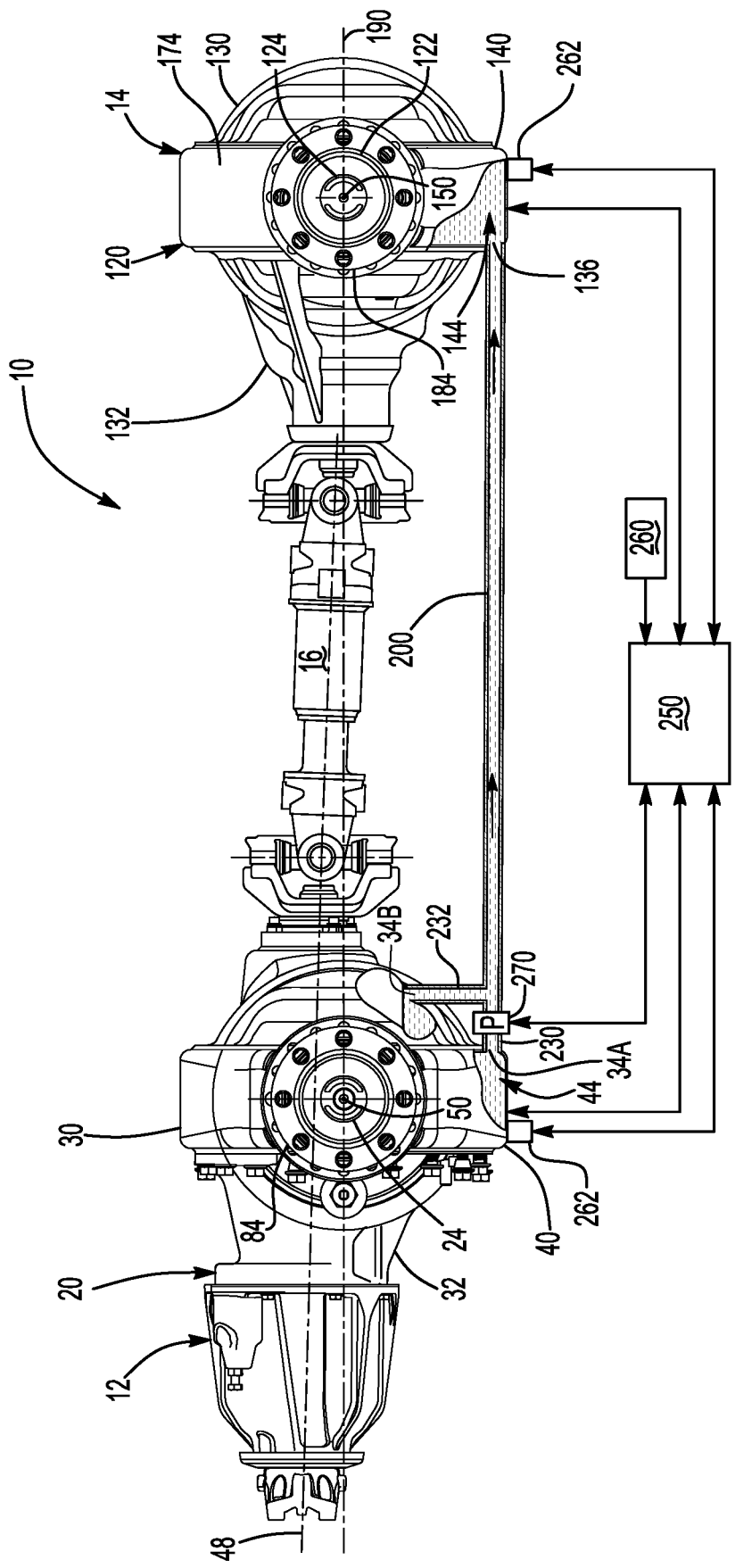
FIG. 8 is a side view of a third configuration of an axle system.
Figure 9:
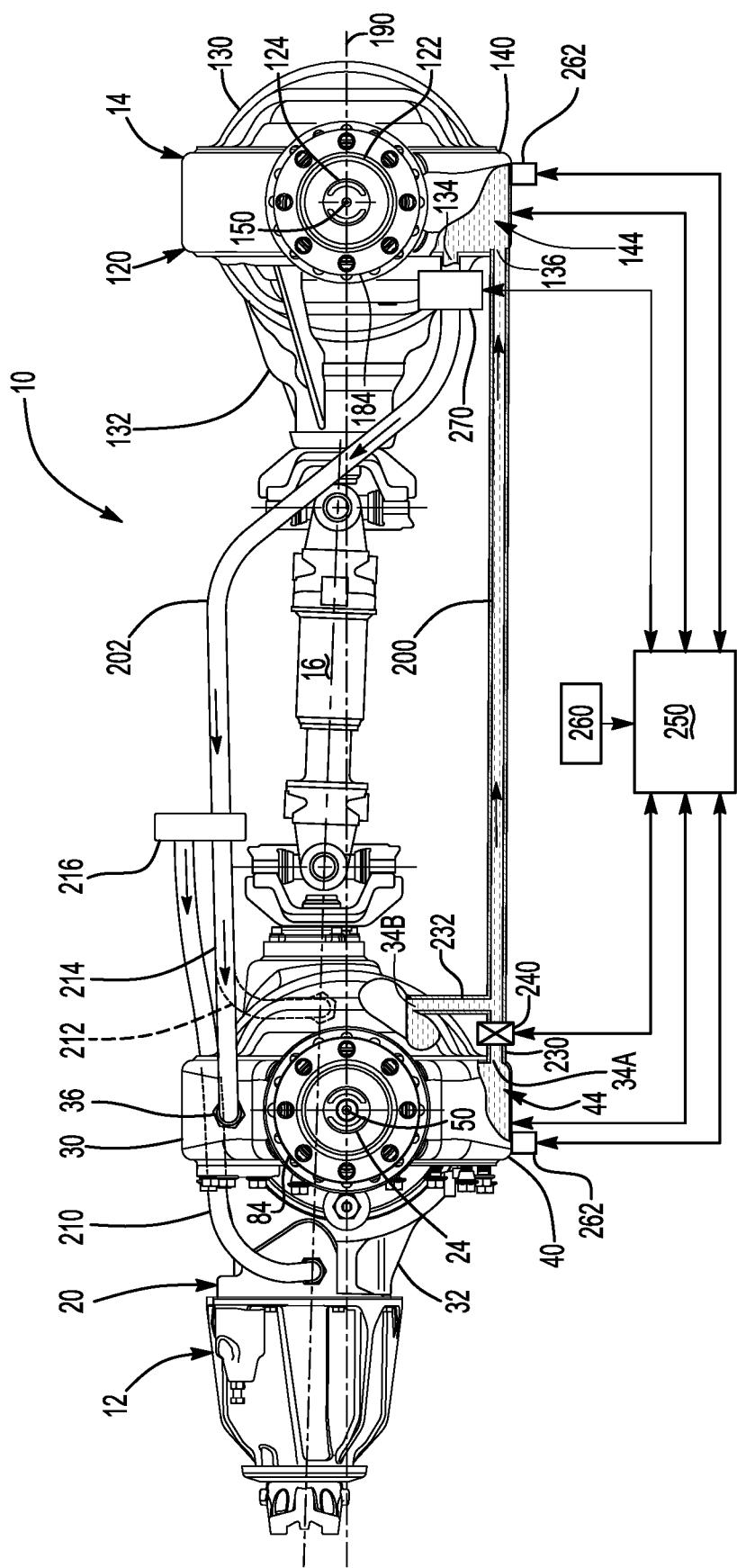
FIG. 9 is a side view of a fourth configuration of an axle system.

The configurations shown in FIGS. 7-9 may provide additional control over the level of lubricant in the axle assemblies. These configurations are primarily described in the context of an axle system in which the differential 22 of the front axle assembly 12 is disconnectable from the torque source; however, it is to be understood that these configurations may be reversed and instead the rear axle assembly 14 may be disconnectable from the torque source.

Referring to FIG. 7, another configuration of an axle system is shown. In this configuration, the rear axle assembly 14 and the second conduit 202 may be the same as previously discussed with respect to FIG. 1. The front axle assembly 12 is depicted as having a first outlet port 34A and a second outlet port 34B. The first outlet port 34A and the second outlet port 34B may be disposed adjacent to the sump portion 44 and below the first axis 50. The first outlet port 34A may be disposed below the second outlet port 34B or further from the horizontal plane 190 than the second outlet port 34B.

The first conduit 200 may include a lower branch 230 and an upper branch 232. The lower branch 230 may be a portion of the first conduit 200 that may extend from the housing assembly 20 to the upper branch 232 and may be coupled to the first outlet port 34A. The upper branch 232 may be coupled to the second outlet port 34B.

A valve 240 may be associated with the first conduit 200. The valve 240 may control the flow of lubricant 46 or lubricant flow from the front axle assembly 12 to the rear axle assembly 14 via the first conduit 200. For example, the valve 240 may be disposed between the housing assembly 20 of the front axle assembly 12 and the housing assembly 120 of the rear axle assembly 14. As such, the upper branch 232 may be disposed between the valve 240 and the housing assembly 120.

The valve 240 may be controlled by a control module or electronic controller 250. For example, the electronic controller 250 may actuate the valve 240 between an open position and a closed position to help control the flow of lubricant 46. The electronic controller 250 may also monitor and/or control various components of the axle system. For example, the electronic controller 250 may be configured to receive data from various sensors, such as a speed sensor 260 that may provide a signal or data indicative of vehicle speed and one or more temperature sensors 262 that may provide a signal or data indicative of lubricant temperature or the temperature of one or more components inside an axle assembly.

Figure 10:
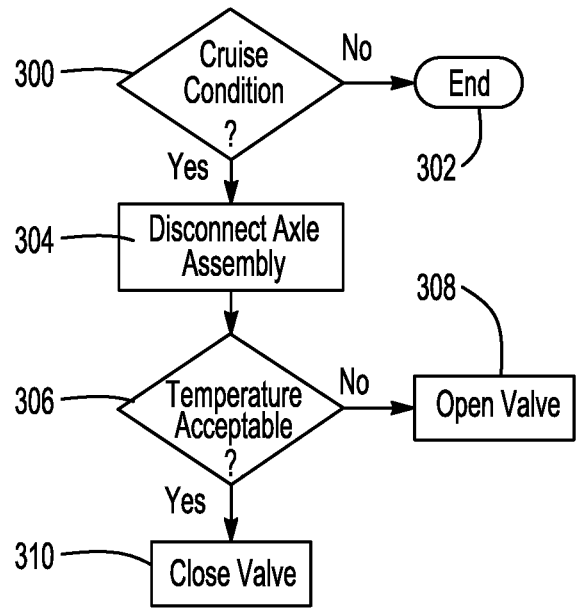
FIGS. 10 and 11 are flowchart of methods of controlling an axle system.

Referring to FIG. 10, a flowchart of an exemplary method of control of the axle system is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using various known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

The method will be primarily described in the context of an axle system in which torque may be selectively provided to the wheels of the front axle assembly 12 independent of providing torque to the rear axle assembly 14. However, it is to be understood that the axle configurations may be reversed and the axle system may selectively provide torque to the wheels of the rear axle assembly 14 independent of providing torque to the wheels of the front axle assembly 12.

At block 300, the method may begin by determining whether the vehicle has attained a cruise condition. A cruise condition may be attained when the vehicle is moving at a steady or substantially steady forward velocity, such as when the speed of the vehicle has reached a predetermined speed for a predetermined period of time or when a vehicle cruise control system has been engaged. Moreover, a cruise condition may be based in part on whether torque demand is sufficiently low to allow an axle assembly to be disconnected. The speed of the vehicle may be provided by the speed sensor 260. The predetermined speed may be a predetermined value that may be based on vehicle development testing. For instance, the predetermined speed may be indicative of a highway speed at which the torque demand on the axle system may be low enough to allow the front axle assembly 12 to be disconnected such that propulsion torque is not provided by the power source to the differential 22 or the wheels of the front axle assembly 12. As nonlimiting examples, the predetermined speed may be 50 mph (80 kph) and the predetermined period of time may around 15 seconds. If the vehicle has not attained the cruise condition, then the method or iteration of the method end at block 302. If the vehicle has attained a cruise condition, then the method may continue at block 304.

At block 304, an axle assembly may be disconnected. Disconnecting an axle assembly may terminate the transmission of torque to the differential or wheels of the axle assembly. The transmission of torque to the differential may be terminated in any suitable manner, such as by actuating a clutch collar to disconnect the drive pinion of the axle assembly from its input. The differential that is disconnected may be disposed in either the front axle assembly 12 or the rear axle assembly 14 depending on the configuration of the axle system. For instance, if the drive pinion 72 of the front axle assembly 12 is disconnected, then the drive pinion 72 of the front axle assembly 12 may not rotate the ring gear 74. As a result, churning losses or frictional drag that may be exerted upon the ring gear 74 and the differential 22 of the front axle assembly 12 by the lubricant 46 may be reduced, which may improve operating efficiency of the axle system and vehicle fuel economy. In addition, the ring gear 74 may not splash lubricant that is located inside the housing assembly 20. Additionally, if the differential 22 is not disconnected from the wheels of the front axle assembly 12, then an axle shaft 24 of the front axle assembly 12 may backdrive or rotate the gears of the differential 22, which in turn may result in the loss of lubricant from inside the differential 22. This lost lubricant may not be sufficiently replenished by splash lubrication since ring gear 74 may not rotate. Likewise, other components like as the roller bearings 64, 80, 98, the interaxle differential unit 90, or combinations thereof may also be deprived of lubricant 46, which may result in increased wear, increased temperatures, and reduce component life if additional lubrication is not provided.

At block 306, the method may determine whether the temperature of the front axle assembly 12, the rear axle assembly 14, or both is acceptable. The temperature may be provided by one or more temperature sensors 262. The temperature of an axle assembly may be acceptable when the temperature is less than a threshold temperature value or less than the threshold temperature value for a predetermined period of time. The threshold temperature value may be a predetermined value that may be based on vehicle development testing. For instance, the threshold temperature value may be 250° F. (121° C.). If the temperature of one or more axle assemblies is not acceptable, then the method may continue at block 308. If the temperature of one or more axle assemblies is acceptable, then the method may continue at block 310.

At block 308, the valve 240 may be actuated to the open position. In the open position, lubricant 46 may be allowed to exit the sump portion 44 of the front axle assembly 12 and flow through the lower branch 230 and the valve 240 to the rear axle assembly 14. As such, the sump portion 44 of the front axle assembly 12 may be allowed to continuously drain and the level of the lubricant 46 in the front axle assembly 12 may not fill up to the second outlet port 34B. Thus, little or no lubricant may flow through the upper branch 232. Opening the valve 240 may allow the level of lubricant in the sump portions 44, 144 to equalize. Moreover, more lubricant 46 may be allowed to flow to the rear axle assembly 14 to help lubricate and cool the rear axle assembly 14 as compared to allowing more lubricant 46 to be stored in the front axle assembly 12, such as may occur when the valve 240 is in the closed position.

At block 306, the valve 240 may be actuated to the closed position. In the closed position, the valve 240 prevents lubricant 46 from flowing through the first outlet port 34A and the lower branch 230 to the rear axle assembly 14. As such, the level of lubricant 46 in the sump portion 44 of the front axle assembly 12 may increase or rise when the valve 240 is closed and the rear axle assembly 14 is operating (i.e., the ring gear of the rear axle assembly 14 is rotating and providing lubricant 46 to the front axle assembly 12 via the second conduit 202) while the level of lubricant 46 in the sump portion 144 of the rear axle assembly 14 may decrease (e.g., the level of lubricant 46 in the sump portions 44, 144 may not equalize). Lubricant 46 may exit the front axle assembly 12 via the second outlet port 34B and the upper branch 232 when the level of lubricant 46 in the housing assembly 20 reaches the second outlet port 34B. Thus, more lubricant 46 may accumulate in the sump portion 44 of the housing assembly 20 of the front axle assembly 12 than in the sump portion 144 of the housing assembly 120 of the rear axle assembly 14 when the valve 240 is closed, yet the upper branch 232 may allow some lubricant 46 to return to the rear axle assembly 14. Reducing the volume of lubricant 46 in the sump portion 144 may reduce churning losses or frictional drag that may be exerted upon the ring gear of the differential 122 by the lubricant 46 and may improve operating efficiency of the rear axle assembly 14 and vehicle fuel economy. In addition, an increased lubricant level in the front axle assembly 12 may also allow the lubricant 46 to reach and lubricate components of the front axle assembly 12, such as the differential 22 and one or more roller bearings 64, 80, 98.

Referring to FIG. 8, another configuration of an axle system is shown. This configuration is similar to the configuration shown in FIG. 7, but omits the second conduit and replaces the valve with a pump 270. The pump 270 may be configured to pump lubricant 46 and may be controlled by the electronic controller 250 and may be of any suitable type. For example, the pump 270 may be a positive displacement pump or a non-positive displacement pump. As an example, the pump 270 may be configured as a bidirectional pump that may be operable to pump lubricant 46 through the first conduit 200 in a first direction from the housing assembly 20 of the front axle assembly 12 to the housing assembly 120 of the rear axle assembly 14 and may pump lubricant in a second direction from the housing assembly 120 of the rear axle assembly 14 to the housing assembly 20 of the front axle assembly 12. Thus, the ports 34A and 136 may function as both inlets and outlets in this configuration. The pump 270 may be used to equalize or not equalize the level of lubricant 46 in the sump portions 44, 144.

Figure 11:
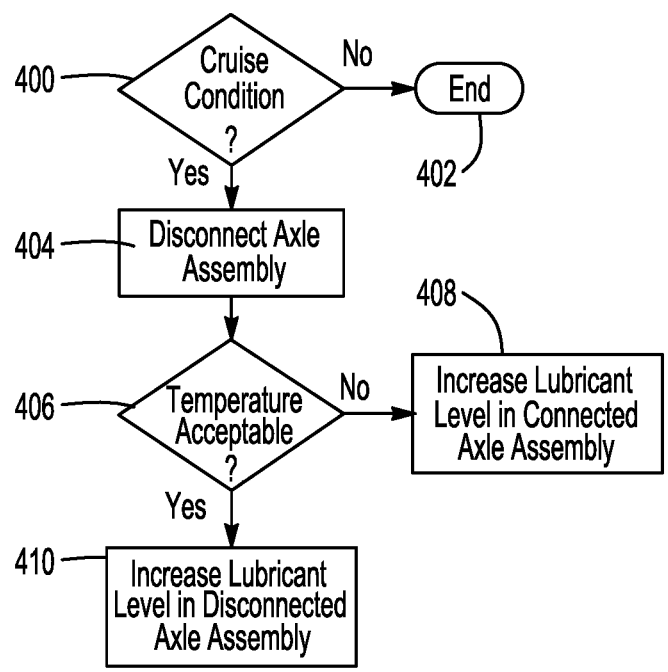

Referring to FIG. 11, the pump 270 may be controlled in a similar manner as the valve discussed in conjunction with the configuration shown in FIG. 7. Blocks 400, 402, 404 and 406 may be the same as blocks 300, 302, 304 and 306.

At block 408, the pump 270 may increase the lubricant level in the connected axle assembly or the driven axle assembly. For instance, the pump 270 may pump lubricant 46 in the first direction to increase the level of lubricant 46 in a driven axle assembly, such as the rear axle assembly 14, to a first predetermined level. For example, the pump 270 may be operated for a predetermined period of time or until a lubricant level sensor detects that the lubricant 46 has reached the first predetermined level. As another option, it is also contemplated that a second predetermined level may be associated with the front axle assembly 12, in which case the pump 270 may pump lubricant 46 in the first direction to decrease the level of lubricant 46 in the front axle assembly 12 to the second predetermined level At block 410, the pump 270 may increase the lubricant level in the disconnected axle assembly. For instance, the pump 270 may pump lubricant 46 in the second direction to increase the level of lubricant in the front axle assembly 12 and decrease the level of lubricant 46 in the rear axle assembly 14 to a third predetermined level, thereby reducing churning losses as previously discussed. For example, the pump 270 may be operated for a predetermined period of time or until a lubricant level sensor detects lubricant has reached the third predetermined level. It is also contemplated that a fourth predetermined level may be associated with the front axle assembly 12, in which case the pump 270 may pump lubricant 46 in the second direction to increase the level of lubricant 46 in the front axle assembly 12 to a fourth predetermined level.

Referring to FIG. 9, another configuration of an axle system is shown. This configuration is similar to the configuration shown in FIG. 7, but changes the position of the second conduit 202 and incorporates a pump 270. This configuration may be provided when the second conduit 202 cannot be routed with a downward slope to the disconnectable axle assembly, such as from the rear axle assembly 14 to the front axle assembly 12 as depicted. The outlet port 134 of the rear axle assembly 14 may be directly fluidly connected to the sump portion 144. As such, the outlet port 134 may be positioned below the second axis 150 and the horizontal plane 190 and below one or more inlet ports of the front axle assembly 12. The pump 270 may be disposed on or inside the rear axle assembly 14. The pump 270 may pump lubricant 46 from the sump portion 144 of the housing assembly 120 of the rear axle assembly 14 to the second conduit 202 and to the front axle assembly 12. The axle system may be controlled in a similar manner as shown in FIG. 10, but the pump 270 may be operated when the vehicle is turned on or in motion.

It is contemplated that in the configurations previously discussed, the valve 240 may be modulated between the open and closed positions to tailor the level of lubricant 46 in the sump portions 44, 144 to particular operating conditions. Similarly, the pump 270 may be modulated between on and off conditions to tailor the level of lubricant 46 and the sump portions 44, 144 to particular operating conditions. As such, the valve 240, the pump 270, or both may be operated in a manner that may decrease the level of lubricant 46 in a disconnected axle assembly and may increase the level of lubricant 46 in the driven axle assembly without equalizing the level of lubricant in the sump portions 44, 144. For instance, the valve 240, pump 270, or both may have intermittent duty cycles that may be based on attributes such as elapsed time or temperature. As such, the valve 240, pump 270, or both may be operated or actuated such as when a predetermined amount of time has elapsed or the detected lubricant temperature or component temperature has increased by predetermined amount to circulate lubricant 46 and help reduce the temperature of the lubricant 46 or an axle system component.

Providing an axle system in which lubricant is shared and circulated between different axle assemblies may help improve overall lubricant life in the axle system (such as by reducing oxidation, improving shear stability, depletion of extreme pressure additives in the lubricant) as lubricant life may be averaged between the axle assemblies and their operational demands (e.g., loads, speeds, and temperatures). For example, axle systems that employ axle assemblies that have different types of gear sets, such as a hypoid gear set and a spiral gear set, may have very different individual lubricant servicing intervals when lubricant is not shared. In addition, providing one or more conduits that route lubricant between the axle assemblies may allow a filter to be added to a conduit outside of the axle assemblies to allow the shared lubricant to be filtered without having to drain lubricant or disassemble an axle assembly to access or replace an internal filter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle system comprising:
a first axle assembly that has a first housing assembly that receives a first differential;
a second axle assembly that has a second housing assembly that receives a second differential; and
a conduit that fluidly connects the first axle assembly to the second axle assembly such that lubricant flows between the first housing assembly and the second housing assembly.

2. The axle system of claim 1 wherein the first differential is rotatable about a first axis, the second differential is rotatable about a second axis and the conduit is disposed below the first axis and the second axis.

3. The axle system of claim 2 further comprising a second conduit that is completely disposed above the first axis and the second axis, wherein the conduit provides lubricant from the first axle assembly to the second axle assembly and the second conduit provides lubricant from the second axle assembly to the first axle assembly.

4. The axle system of claim 1 wherein the first housing assembly defines a first sump portion, the second housing assembly defines a second sump portion, and the conduit extends from the first sump portion to the second sump portion.

5. The axle system of claim 4 further comprising a pump that is configured to pump lubricant through the conduit from the second housing assembly to the first housing assembly.

6. The axle system of claim 5 wherein the pump is a bidirectional pump that is configured to pump lubricant through the conduit from the first housing assembly to the second housing assembly.

7. An axle system comprising:
a first axle assembly that has a first housing assembly that receives a first differential; and
a second axle assembly that has a second housing assembly that receives a second differential;
a first conduit that transports lubricant from the first housing assembly to the second housing assembly; and
a second conduit that transmits lubricant from the second housing assembly to the first housing assembly.

8. The axle system of claim 7 wherein the second differential receives torque from the first axle assembly and the first conduit is completely disposed below the second conduit.

9. The axle system of claim 7 wherein the first differential is rotatable about a first axis, the first conduit is disposed below the first axis, and the second conduit is coupled to the first housing assembly above the first axis.

10. The axle system of claim 7 wherein the second conduit is coupled to the second housing assembly above where the second conduit is coupled to the first housing assembly.

11. The axle system of claim 7 wherein the first conduit and the second conduit are completely disposed outside of the first housing assembly and the second housing assembly.

12. The axle system of claim 7 wherein the second conduit has a plurality of branches that each provide lubricant to different inlet port of the first housing assembly.

13. The axle system of claim 12 wherein the first housing assembly includes a first inlet port and a second inlet port that are disposed on opposite sides of the first housing assembly.

14. The axle system of claim 7 wherein the second conduit provides lubricant to a lubricant reservoir that is disposed inside the first housing assembly and is disposed above the first differential, wherein first and second outlet tubes receive lubricant from the lubricant reservoir and provide lubricant to first and second bearings disposed inside the first housing assembly.

15. The axle system of claim 7 wherein the first conduit includes an upper branch and a lower branch that are configured to receive lubricant from the first axle assembly, wherein the upper branch is coupled to a second outlet port of the first housing assembly, the lower branch is coupled to a first outlet port of the first housing assembly, and the second outlet port is disposed above the first outlet port.

16. The axle system of claim 15 further comprising a valve that controls lubricant flow from the first axle assembly through the first conduit, wherein the upper branch is disposed between the valve and the second housing assembly.

17. The axle system of claim 16 wherein lubricant from the second axle assembly accumulates in a sump portion of the first housing assembly and does not flow through the lower branch when the valve is closed.

18. The axle system of claim 16 wherein lubricant flows through the upper branch to the second axle assembly when a level of lubricant in the first housing assembly reaches the second outlet port.

19. The axle system of claim 7 further comprising a pump that is disposed proximate the second axle assembly, wherein the pump pumps lubricant from the second housing assembly to the first housing assembly.

20. The axle system of claim 19 wherein the first conduit is coupled to the second housing assembly adjacent to a sump portion of the second axle assembly and the pump pumps lubricant from the sump portion of the second axle assembly to the first axle assembly.

* * * * *